June 24, 1969   S. F. BARBER   3,451,627
TUBULAR PART HAVING A PASSAGEWAY FORMED IN THE WALL THEREOF
Filed Feb. 16, 1967
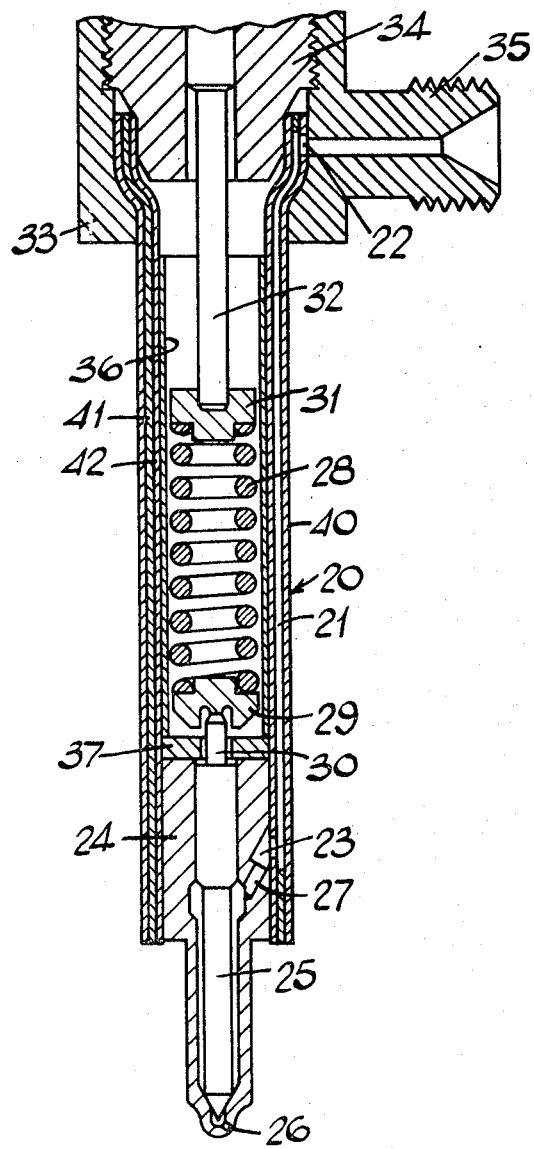

United States Patent Office 3,451,627
Patented June 24, 1969

3,451,627
TUBULAR PART HAVING A PASSAGEWAY FORMED IN THE WALL THEREOF
Stanley Frederick Barber, Pinner, England, assignor to C.A.V. Limited, London, England, a British company
Filed Feb. 16, 1967, Ser. No. 616,708
Claims priority, application Great Britain, Mar. 28, 1966, 13,511/66
Int. Cl. B05b 1/32, 1/30, 15/00
U.S. Cl. 239—533                2 Claims

ABSTRACT OF THE DISCLOSURE

A tubular part having a passageway formed in the wall thereof and formed by a tubular member having a longitudinal slot formed therein, the slot being closed by means of a pair of members, disposed on the external and internal peripheries of the tubular member respectively.

---

This invention relates to a method of forming a tubular part having a passageway formed in the wall thereof and has for its object to provide such a method in a simple and convenient form.

A method in accordance with the invention comprises forming in the wall of a tubular member a slot of appropriate shape and closing the slot by means of a pair of members located in fluid tight engagement with the internal and external peripheries of the tubular member respectively.

One example of the invention will now be described with reference to the accompanying drawing in which there is shown a liquid fuel injection nozzle unit for use with internal combustion engines and which has a body part 20 which is formed in accordance with the invention.

The body portion 20 comprises a first tubular member 41 in which is formed a longitudinally extending slot 21 which terminates short of opposite ends of the members. Also provided is an outer member 40 and an inner member 42 and conveniently these are also of tubular form and are located in fluid tight engagement with the respective peripheries of the member 41. In this manner the slot 21 is closed throughout its length and thus defines a passageway extending within the wall of the body portion. The inner member 42 is provided with an aperture 23 therethrough which communicates with one end of the passageway 21 and the outer member 40 is provided with an aperture 22 therethrough and which communicates with the opposite end of the passageway. During assembly of the tubular members they are copper brazed together to a form a fluid tight structure.

Within the lower end of the body part 20 is secured a nozzle head 24 in which is slidably mounted a valve member 25. The nozzle head defines an orifice 26 at its outer end and the valve member serves to control the flow of fuel through this orifice from an inlet passage 27 formed in the nozzle head and in communication with the aperture 23 of the passageway 21. The valve member is loaded towards a closed position by a coiled compression spring 28 which is mounted within the body part, and which bears upon the spring abutment 29 bearing against a projection 30 extending from the valve member 25.

The other end of the spring bears against a further abutment 31 which is located within the body part upon a rod 32 extending from the other end thereof. This end of the body part is of enlarged diameter and is located within a hollow cylindrical member 33 which is shaped on its internal periphery to closely correspond with the shape of the body part. Within the member 33 is engaged a clamping plug 34 which serves to outwardly press the body part into contact with the shaped surface of the member 33. In this manner a fluid tight seal is obtained between the body part and the cylindrical member 33. The cylindrical member is provided with a radially extending inlet connection 35 in which is formed a fuel passage which is in communication with the aperture 22.

The rod 32 is adjustably mounted within the clamping plug 34 so that the force exerted by the coiled compression spring 28 upon the valve member 25 can be adjusted. Moreover, within the body part there is provided a sleeve 36 which is arranged to retain a stop plate 37 in position adjacent the inner edge of the nozzle head 24. The stop plate acts to limit the movement of the valve member 25 when fuel under pressure causes the valve member to move against the action of the spring 28 to allow fuel to flow through the orifice 26.

By the arrangement described what has previously been a difficult and expensive operation i.e. the provision of the passageway 21 in the body part, no longer presents difficulties, in addition the body part itself is formed from tubular members and therefore expensive machining operations which have previously been necessary are no longer required.

Having thus described my invention what I claim as new and desire to secure by Letters Patent is:

1. A tubular part having passage means formed therein and comprising a first tubular member, an elongated slot extending through the wall of the first tubular member, a second tubular member in fluid tight engagement with the outer periphery of the first tubular member, an opening formed in said second tubular member and in register with said slot, a third tubular member in fluid tight engagement with the inner periphery of said first tubular member and a further opening formed in said third tubular member and in register with said slot, the openings and said slot defining said passage means.

2. A liquid fuel injection nozzle unit comprising an elongated body portion defined by a first tubular member having an elongated slot extending through the wall thereof, a second tubular member in fluid tight engagement with the outer periphery of the first tubular member, an opening formed in said second tubular member and in register with said slot, a third tubular member in fluid tight engagement with the inner periphery of said first tubular member, a further opening formed in said third tubular member and in register with said slot, a nozzle head mounted within said third tubular member and at one end thereof, a fuel passage defined in said head said fuel passage registering with said further opening, a resiliently loaded valve member for controlling the flow of fuel through said passage, clamping means serving to hold the other end of said body portion and a fuel inlet formed in said clamping means and in communication with said first mentioned opening.

References Cited

UNITED STATES PATENTS

| | | | |
|---|---|---|---|
| 2,521,224 | 9/1950 | Kammer | 239—88 |
| 3,040,989 | 6/1962 | Massal | 239—584 X |
| 3,053,463 | 9/1962 | De Milleville | 239—584 |
| 3,339,848 | 9/1967 | Geiger | 239—533 X |
| 3,171,601 | 3/1965 | Campbell | 239—453 |

EVERETT W. KIRBY, *Primary Examiner.*

U.S. Cl. X.R.

137—604; 138—42; 239—132.5, 453